(12) United States Patent
Yokoyama et al.

(10) Patent No.: US 11,183,819 B2
(45) Date of Patent: Nov. 23, 2021

(54) SPARK PLUG

(71) Applicant: NGK SPARK PLUG CO., LTD., Nagoya (JP)

(72) Inventors: Yutaka Yokoyama, Nagoya (JP); Nobuyoshi Araki, Nagoya (JP); Kuniharu Tanaka, Nagoya (JP); Haruki Yoshida, Nagoya (JP); Hironori Uegaki, Nagoya (JP); Toshiki Kon, Nagoya (JP); Yusuke Nomura, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 98 days.

(21) Appl. No.: 16/574,170

(22) Filed: Sep. 18, 2019

(65) Prior Publication Data
US 2020/0112146 A1   Apr. 9, 2020

(30) Foreign Application Priority Data
Oct. 3, 2018  (JP) .............................. JP2018-188625

(51) Int. Cl.
*H01T 13/38* (2006.01)
*H01B 3/12* (2006.01)
*C04B 35/111* (2006.01)

(52) U.S. Cl.
CPC ............ *H01T 13/38* (2013.01); *C04B 35/111* (2013.01); *H01B 3/12* (2013.01); *C04B 2235/3217* (2013.01); *C04B 2235/784* (2013.01); *C04B 2235/786* (2013.01)

(58) Field of Classification Search
CPC ......... H01T 13/38; H01B 3/12; C04B 35/111; C04B 2235/3217; C04B 2235/786; C04B 2235/5445; C04B 2235/785
See application file for complete search history.

(56) References Cited

U.S. PATENT DOCUMENTS

| 8,183,754 | B2* | 5/2012 | Kuribayashi | ........... H01T 21/02 313/118 |
| 2010/0200427 | A1* | 8/2010 | Koike | ................ G01N 27/4075 205/775 |
| 2012/0017622 | A1 | 7/2012 | Nakagawa et al. | |
| 2013/0175917 | A1* | 7/2013 | Kodama | .................. C25D 7/00 313/141 |
| 2014/0336035 | A1* | 11/2014 | Takaoka | .................. H01T 13/38 501/139 |

FOREIGN PATENT DOCUMENTS

| JP | S63-190753 A | 8/1988 |
| JP | 2000-313657 A | 11/2000 |
| JP | 2011-070929 A | 4/2011 |
| WO | WO 2013/008919 A1 | 1/2013 |

OTHER PUBLICATIONS

Notice of Reasons for Refusal issued in connection with corresponding Japanese Patent Application No. 2018-188625, dated Aug. 21, 2020.

* cited by examiner

*Primary Examiner* — Noah S Wiese
(74) *Attorney, Agent, or Firm* — Kusner & Jaffe

(57) ABSTRACT

A spark plug according to one embodiment of the present invention includes an insulator formed of an alumina-based sintered body, wherein the insulator contains 90 wt % or more of an aluminum component in terms of oxide, and wherein crystal grains of the insulator has an average grain size of 1.5 mm or smaller and a grain size standard deviation of 1.2 μm or smaller.

3 Claims, 1 Drawing Sheet

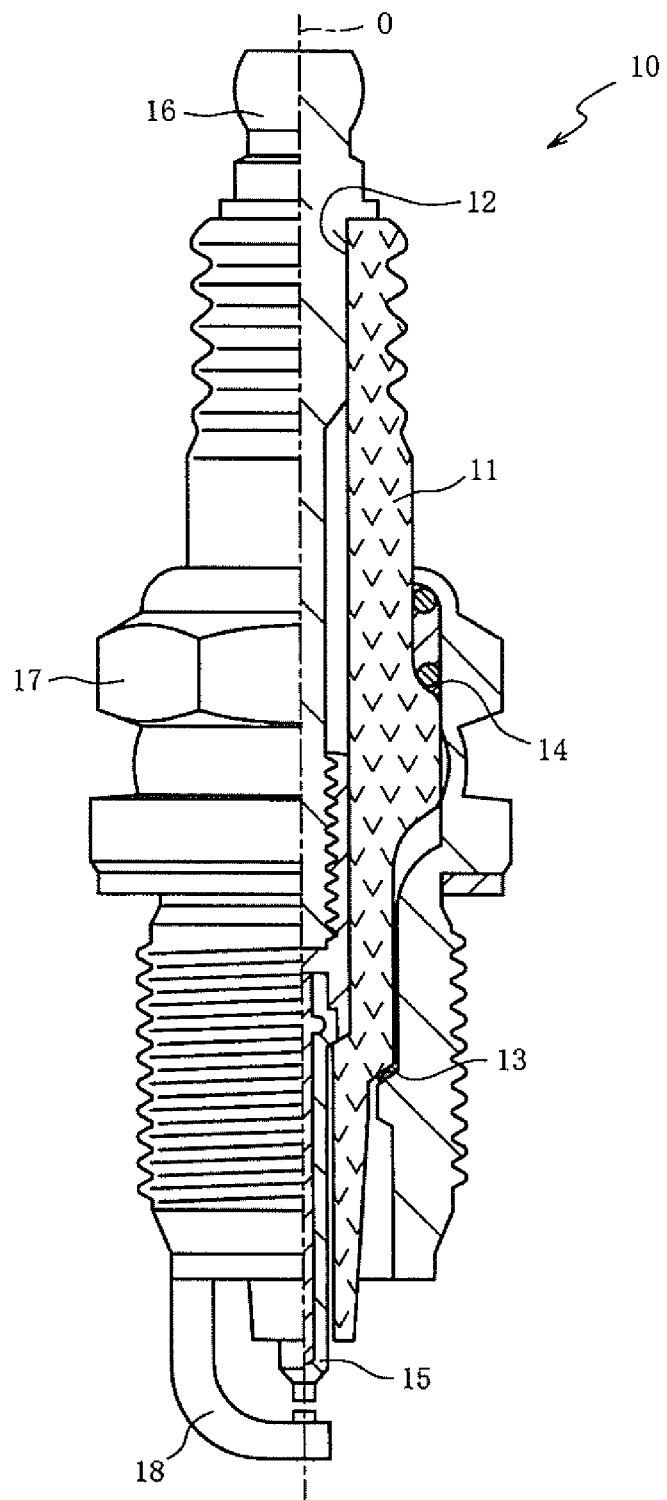

// SPARK PLUG

FIELD OF THE INVENTION

The present invention relates to a spark plug, particularly of the type having an insulator with improved mechanical strength.

BACKGROUND OF THE INVENTION

There is known a spark plug for an internal combustion engine, in which an insulator is in the form of an alumina-based sintered body that contains alumina as a predominant component. Japanese Laid-Open Patent Publication No. 2000-313657 and Japanese Laid-Open Patent Publication No. 2011-70929 each disclose a technique of improving the withstand voltage performance of the insulator by adjusting the content ratio between the alumina and sintering aid such as CaO or BaO in the alumina-based sintered body.

SUMMARY OF THE INVENTION

There has been a recent demand to further improve the mechanical strength of the insulator to a higher level than that by the above technique.

The present invention has been made to meet this demand. One main advantage of the present invention is to provide a spark plug having an insulator with improved mechanical strength.

According to one aspect of the present invention, there is provided a spark plug comprising an insulator formed of an alumina-based sintered body, wherein the insulator contains 90 wt % or more of an aluminum component in terms of oxide, and wherein crystal grains of the insulator has an average grain size of 1.5 μm or smaller and a grain size standard deviation of 1.2 μm or smaller.

The other objects and features of the present invention will also become understood from the following description.

BRIEF DESCRIPTION OF DRAWINGS

FIG. 1 is a side view, half in section, of a spark plug according to one embodiment of the present invention.

DETAILED DESCRIPTION OF THE INVENTION

Hereinafter, an exemplary embodiment of the present invention will be described in detail below with reference to the drawing.

FIG. 1 is a side view, half in section, of a spark plug 10 for an internal combustion engine according to one embodiment of the present invention. In FIG. 1, one side of the spark plug 10 with respect to its axis O is shown in cross section. In the present specification, the lower and upper sides of FIG. 1 are respectively referred to as front and rear sides of the spark plug 10.

As shown in FIG. 1, the spark plug 10 includes an insulator 11, a center electrode 15 and a metal shell 17.

The insulator 11 is in the form of an alumina-based sintered body having good mechanical properties and good insulating properties under high-temperature conditions. The insulator 11 is substantially cylindrical-shaped, with an axial hole 12 being formed therethrough along the axis O, and has on an outer circumference thereof a frontward-facing inclined surface as a first engagement portion 13 and a rearward-facing inclined surface as a second engagement portion 14.

The center electrode 15 is made of a metal material (such as nickel-based alloy) in a rod shape and is inserted and held in a front side of the axial hole 12. A metal terminal 16, which is made of a conductive metal material (such as low carbon steel) in a rod shape and to which a high-voltage cable (not shown) is attached, is inserted and held in a rear side of the axial hole 12 and is electrically connected at a front end thereof to the center electrode 15 within the axial hole 12.

The metal shell 17 is made of a conductive metal material (such as low carbon steel) and is substantially cylindrical-shaped to be fixed in a threaded mounting hole (not shown) of the internal combustion engine. The metal shell 17 is disposed around the outer circumference of the insulator 11 so as to hold the insulator 11 by sandwiching the first and second engagement portions 13 and 14 of the insulator 11 from both sides in the direction of the axis O. A ground electrode 18, which is made of a metal material (such as nickel-based alloy) in a rod shape, is joined to the metal shell 17 and is opposed to the center electrode 15 such that there is a spark gap defined between the center electrode 15 and the ground electrode 18.

In the present embodiment, the insulator 11 contains alumina ($Al_2O_3$) as a predominant component and a sintering aid as an additive component.

More specifically, the alumina-based sintered body as the insulator 11 contains 90 wt % or more of an aluminum (Al) component in terms of $Al_2O_3$. The amount of the Al component contained in the alumina-based sintered body is preferably 98 wt % or less. When the amount of the Al component contained in the alumina-based sintered body is 90 wt % or more, the alumina-based sintered body ensures a high degree of sintering and achieves good withstand voltage performance. The Al component forms a crystal phase of $Al_2O_3$, $BaAl_{12}O_{19}$, $BaAl_2Si_2O_8$ or the like and exists in crystal grains or grain boundaries of the alumina-based sintered body.

The sintering aid exists, as an oxide, ions or the like, in the crystal grains or grain boundaries of the alumina-based sintered body. Examples of the sintering aid are: inorganic compounds such as oxides, composite oxides, hydroxides, carbonates, chlorides, sulfates and nitrates of Si, Mg, Ba, Ca, rare-earth elements and the like; and natural minerals. These sintering aids can be used solely or in combination of two or more thereof. The sintering aid generally performs the function of promoting densification of the sintered body by melting and forming a liquid phase during the sintering. Depending on the kind of the sintering aid, the sintering aid may also perform the function of suppressing abnormal grain growth of the alumina so as to ensure the mechanical strength of the insulator 11.

The alumina-based sintered body may additionally contain any other elements such as unavoidable impurities within the range that does not impair the effects of the present invention. Examples of such additional elements are Na, S, N, B, Ti, Mn, Ni, K, Fe and the like.

The insulator 11 and the spark plug 10 can be produced by the following procedures.

As a raw material for the insulator 11, an Al compound and the sintering aid are provided in powder form. A slurry is formed by mixing these raw material powders with a binder and a solvent. Other additives such as plasticizer, antifoaming agent and dispersant may be added to the slurry as needed. It is preferable to perform the mixing of the raw material powders for 8 hours or more in order to make the mixed state of the raw material powders uniform and allow high densification of the sintered body.

There is no particular limitation on the kind of the Al compound used as long as the Al compound is converted to alumina by the later firing step. In general, an alumina powder is used as the raw material powder. Since the Al compound powder practically contains a sodium (Na) component as an unavoidable impurity, it is preferable to use the Al compound powder of high purity. For example, the purity of the Al compound powder is preferably 99.5% or higher.

In order for the sintered body to ensure good mechanical strength, the Al compound is preferably used in such an amount that the sintered body contains 90 to 98 wt % of aluminum in terms of oxide based on the total weight of the sintered body (in terms of oxide) after the firing step as 100 wt %.

Further, it is preferable that the Al compound powder has a particle size D50 (also called "median diameter") of 0.4 to 1.5 µm and a particle size D90 of 1.0 to 3.5 µm in order to obtain the dense sintered body. The term "particle size D50" refers to, when a cumulative distribution of particle sizes is measured, a value of the particle size at 50% in the cumulative distribution. Similarly, the term "particle size D90" refers to a value of the particle size at 90% (as undersize) in the cumulative distribution. In the present specification, each of the "particle size D50" and the "particle size D90" is a value measured with a laser diffraction/light scattering particle size distribution analyzer (available as LA950 from HORIBA Ltd.).

The preferable purity range and particle size distribution of the sintering aid powder are basically the same as those of the Al compound powder.

There is no particular limitation on the kind of the binder used as long as the binder is capable of imparting good formability to the raw material powders. As such a binder, there can be used a hydrophilic binding agent. Examples of the hydrophilic binding agent include polyvinyl alcohol, water-soluble acrylic resin, gum arabic, dextrin and the like. These binders can be used solely or in combination of two or more thereof.

The binder is preferably in an amount of 0.1 to 7 parts by mass, more preferably 1 to 5 parts by mass, relative to 100 parts by mass of the raw material.

There is also no particular limitation on the kind of the solvent used as long as the raw material powders are dispersed in the solvent. Examples of the solvent include water, alcohol and the like. These solvents can be used solely or in combination of two or more thereof.

The solvent is preferably used in an amount of 40 to 120 parts by mass, more preferably 50 to 100 parts by mass, relative to 100 parts by mass of the raw material.

The above-formed slurry is granulated by spray drying etc. into a granular powder of spherical particles. It is preferable that the granular powder has an average particle size of 30 to 200 µm, more preferably 50 to 150 µm. In the present specification, the "average particle size" is a value measured with a laser diffraction/light scattering particle size distribution analyzer (available as LA950 from HORIBA Ltd.).

The granular powder is press-formed with a rubber press, mold press or the like. As a matter of course, the method of forming the granular powder is not limited to press-forming. The granular powder can alternatively be formed by any other method such as injection molding. The formed body is shaped into a desired shape by grinding with a resinoid wheel or the like.

The thus-shaped formed body is heated to a maximum temperature of 1450° C. or higher within 4 hours under the air atmosphere, fired at the maximum temperature for 1 to 1.5 hours, and then, cooled. Consequently, there is obtained the alumina-based sintered body. The mechanical strength of the alumina-based sintered body (as the insulator 11) is ensured by suppressing abnormal grain growth of the alumina.

On the other hand, the center electrode 13 and the ground electrode 16 are each formed by processing the electrode material such as nickel-based alloy into a predetermined shape and dimensions. Further, the metal shell 15 is formed by plastic working in a predetermined shape and dimensions. The ground electrode 16 is joined to the metal shell 15 by resistance welding etc. The center electrode 13 and the metal terminal 16 are fitted in the insulator 11 by a known method. The insulator 11 in which the center electrode 13 and the metal terminal 16 have been fitted is assembled into the metal shell 15 to which the ground electrode 16 has been joined. Then, a distal end portion of the ground electrode 16 is bent toward the center electrode 13 such that a distal end of the ground electrode 16 is opposed to a front end of the center electrode 13. With this, the spark plug 10 is completed.

In the present embodiment, the crystal grains of the insulator 11 has an average grain size of 1.5 µm or smaller and a grain size standard deviation of 1.2 µm or smaller. The grain size of the crystal grains is determined by the intercept method as will be explained in detail later.

It is feasible to control the average grain size and grain size standard deviation of the crystals of the insulator 11 by adjusting the particle size distributions of the Al compound powder and the sintering aid powder, the amount of the sintering aid powder used, and the like. It is likely that grain growth, which leads to a greater grain size, will occur in the alumina-based sintered body when the particle size of the Al compound powder or sintering aid powder is small or when the amount of the sintering aid powder used is large. When the crystal grains of the insulator 11 has an average grain size of 1.5 µm or smaller and a grain size standard deviation of 1.2 µm or smaller, a stress caused under the action of a load on the insulator 11 is effectively dispersed so as to prevent the occurrence of a crack due to concentration of the stress onto any of the crystal grains. Accordingly, the insulator 11 is improved in mechanical strength.

In order to more effectively prevent the crack by stress dispersion and thereby further improve the mechanical strength of the insulator 11, it is preferable that the grain size standard deviation of the crystal grains of the insulator 11 is 1.0 µm or smaller. It is also preferable that the average grain size of the crystal grains of the insulator 11 is 1.0 µm or smaller in order to more effectively prevent the crack by stress dispersion and thereby further improve the mechanical strength of the insulator 11. When the lower limit of the grain size standard deviation of the crystal grains of the insulator 11 is 0.2 µm, it is possible to facilitate the process management for controlling the grain size standard deviation to a small degree and, at the same time, possible to ensure the toughness of the insulator 11 by allowing the crystal grains of relatively great size to perform the function of preventing development of the crack.

Herein, the grain size of the crystal grains of the insulator 11 is a value measured by polishing or grinding a cross section of a part of the insulator 11 located frontward of the first engagement portion 13 and observing the polished or ground cross section of the insulator 11. In a state that the spark plug 10 is mounted to the internal combustion engine, the part of the insulator 11 located frontward of the first engagement portion 13 is exposed to combustion gas. The part of the insulator 11 located frontward of the first engagement portion 13 tends to be subjected to bending load by the pressure of the combustion gas and thus has the risk of being broken due to such bending load. By improving the mechanical strength of this front part of the insulator 11, the occurrence of defects such as breakage in the insulator 11 is effectively prevented.

EXAMPLES

The present invention will be described in more detail below by way of the following examples. It should be understood that the following examples are illustrative and are not intended to limit the present invention thereto.

(Production of Alumina-Based Sintered Bodies)

As raw material powders, alumina powders and sintering aid powders of various particle size distributions were provided. The sintering aid powders used were powders of $SiO_2$ and powders of carbonates of Ba, Ca and Mg. These raw material powders were mixed at various ratios. Each of the resulting powdery raw materials was mixed with polyvinyl alcohol as a binder and water as a solvent, thereby forming a slurry. The slurry was granulated by spray drying into a granular powder of spherical particles with an average particle size of about 100 μm. The granular powder was press-formed with a mold press and thereby shaped into a rectangular cross-section columnar body. The columnar formed body was fired in a temperature range of 1450° C. to 1650° C. for 1 to 8 hours under the air atmosphere. The thus-obtained sintered body was processed with a surface grinding machine etc. into a test sample of 3 mm thickness and 4 mm width as defined in JIS R1601:2008.

In this way, alumina-based sintered bodies with various average grain sizes and grain size distributions were produced as test samples of No. 1 to No. 23 by appropriately setting the particle size distributions (D50 and D90) of the raw material powders. The respective alumina-based sintered bodies had a relative density of 94 to 99%.

The above-produced sintered bodies were evaluated by the following methods.

(Composition of Sintered Body)

Each of the sintered bodies was analyzed by X-ray fluorescence analysis or chemical analysis. Using the analysis results, the contents of $Al_2O_3$ and the sintering aid in each sintered body was determined based on the total weight of the respective detected components (in terms of oxide) as 100 wt %.

(Particle Size Distributions of Raw Material Powders)

The particle sizes D50 and D90 of the respective raw material powders were measured with a laser diffraction/light scattering particle size distribution analyzer (available as LA950 from HORIBA Ltd.).

(Average Grain Size and Standard Deviation of Crystal Grains)

Each of the sintered bodies was cut. The resulting cross section of the sintered body was treated by mirror polishing and then by thermal etching. Chemical etching may be performed in place of thermal etching. The treated cross section of the test sample was observed with a scanning electron microscope (SEM). In the SEM observation, the acceleration voltage of the SEM was set to 15 kV; and the working distance of the SEM was set to 10 to 12 mm SEM images of the cross section were randomly captured at ten locations each with a rectangular field of view of 20 μm×15 μm.

The captured SEM images were respectively binarized by an image analysis software ("Analysis Five" available from Soft Imaging System GmbH). The binarization threshold was set as follows. Among the SEM images, the secondary electron image and the reflected electron image were checked. Lines were drawn along dark-colored boundaries (corresponding to grain boundaries) on the reflected electron image so as to specify the positions of the grain boundaries. The reflected electron image was smoothened while maintaining the edges of the grain boundaries. Then, a graph was obtained from the reflected electron image, with lightness on the horizontal axis and frequency on the vertical axis. As the obtained graph had two peaks, the lightness at the midpoint between these two peaks was set as the binarization threshold.

Using the binarized SEM images, the grain size of the crystal grains was determined by the following intercept method. First, the crystal grains intersecting at least either one of two diagonal lines of the rectangular area were selected. The maximum diameter of each of the selected crystal grains was measured as a longer diameter D1. The maximum diameter was herein defined as a maximum value among outer diameters of the crystal grain as measured in all directions. Further, the outer diameter of each of the selected crystal grains along a straight line passing through the midpoint of the longer diameter D1 and extending perpendicular to the longer diameter D1 was measured as a shorter diameter D2. The average value of the longer and shorter diameters D1 and D2 was calculated as the apparent grain size of the crystal grain. The average of the apparent particle size values of the n number of crystal grains intersecting at least one of two diagonal lines of each image was determined as the average grain size of the crystal grains in the field of view of the image. The standard deviation of the distribution of the apparent particle size values of the n number of crystal grains intersecting at least one of two diagonal lines of each image was determined as the grain size standard deviation of the crystal grains in the field of view of the image. In view of the fact that the average grain size and grain size standard deviation somewhat vary from one field of view of the image to another, the average values of the average grain sizes and grain size standard deviations in ten fields of view were respectively adopted as the average grain size and grain size standard deviation of the crystal grains of the sintered body.

(Bending Strength of Sintered Body)

The sintered bodies (ten samples for each type of sintered body) were tested for their three-point bending strength at room temperature (5 to 35° C.) according to JIS R1601: 2008. The average value of the three-point bending strength test results was adopted as the bending strength of the sintered body.

The compositions and evaluation results of the respective sintered bodies are shown in TABLE 1.

TABLE 1

| | Composition (wt %) | | Crystal grain size (μm) | | | | |
|---|---|---|---|---|---|---|---|
| No. | $Al_2O_3$ | Sintering aid | Particle diameter distribution (μm) | | Average grain size | Standard deviation | Bending strength (MPa) |
| | | | D50 | D90 | | | |
| 1 | 92.61 | 7.39 | 0.58 | 1.23 | 0.79 | 0.44 | 654 |
| 2 | 93.04 | 6.96 | 0.58 | 1.20 | 0.87 | 0.42 | 729 |
| 3 | 93.26 | 6.74 | 0.58 | 1.21 | 0.89 | 0.48 | 708 |

TABLE 1-continued

| | Composition (wt %) | | Particle diameter distribution (μm) | | Crystal grain size (μm) | | Bending strength (MPa) |
|---|---|---|---|---|---|---|---|
| No. | Al$_2$O$_3$ | Sintering aid | D50 | D90 | Average grain size | Standard deviation | |
| 4 | 93.28 | 6.72 | 0.56 | 1.20 | 0.86 | 0.48 | 674 |
| 5 | 93.13 | 6.87 | 0.60 | 1.23 | 0.86 | 0.47 | 709 |
| 6 | 93.19 | 6.81 | 0.64 | 1.27 | 0.88 | 0.42 | 673 |
| 7 | 95.46 | 4.54 | 0.49 | 1.01 | 0.66 | 0.30 | 737 |
| 8 | 95.26 | 4.74 | 0.97 | 1.98 | 0.95 | 0.78 | 601 |
| 9 | 93.44 | 6.56 | 0.89 | 1.69 | 0.92 | 0.58 | 631 |
| 10 | 94.55 | 5.45 | 0.89 | 1.70 | 0.93 | 0.59 | 610 |
| 11 | 94.11 | 5.89 | 0.80 | 1.69 | 0.92 | 0.61 | 621 |
| 12 | 93.69 | 6.31 | 0.90 | 1.70 | 0.92 | 0.57 | 630 |
| 13 | 93.45 | 6.55 | 0.88 | 1.67 | 0.93 | 0.56 | 622 |
| 14 | 94.12 | 5.88 | 0.89 | 1.67 | 0.91 | 0.56 | 620 |
| 15 | 92.88 | 7.12 | 0.97 | 2.00 | 1.03 | 0.89 | 598 |
| 16 | 93.45 | 6.55 | 1.08 | 2.10 | 1.21 | 0.80 | 581 |
| 17 | 93.14 | 6.86 | 1.10 | 2.22 | 1.10 | 0.98 | 582 |
| 18 | 93.29 | 6.71 | 0.59 | 1.23 | 1.15 | 1.08 | 568 |
| 19 | 94.21 | 5.79 | 1.37 | 3.47 | 1.47 | 1.18 | 552 |
| 20 | 93.40 | 6.60 | 1.68 | 3.80 | 1.69 | 0.95 | 525 |
| 21 | 93.38 | 6.62 | 1.55 | 3.76 | 1.54 | 1.06 | 545 |
| 22 | 93.34 | 6.66 | 0.67 | 2.07 | 1.03 | 1.23 | 532 |
| 23 | 93.31 | 6.69 | 0.88 | 5.59 | 1.62 | 1.38 | 520 |

As shown in TABLE 1, the test samples of No. 1 to No. 19 where the crystal grains had an average grain size of 1.5 μm or smaller and a grain size standard deviation of 1.2 μm or smaller showed a bending strength of 550 MPa or higher. The test samples of No. 1 to No. 19 were higher in bending strength than the test samples of No. 20 to No. 23 where the crystal grains had an average grain size of greater than 1.5 μm or a grain size standard deviation of greater than 1.2 μm.

The test samples of No. 1 to No. 17 where the crystal grains had an average grain size of 1.5 μm or smaller and a grain size standard deviation of 1.0 μm or smaller showed a bending strength of 580 MPa or higher, which was higher than that of the test samples of No. 18 and No. 19 where the crystal grains had an average grain size of 1.5 μm or smaller and a grain size standard deviation of greater than 1.0 μm and small than or equal to 1.2 μm.

The test samples of No. 1 to No. 14 where the crystal grains had an average grain size of 1.0 μm or smaller and a grain size standard deviation of 1.0 μm or smaller showed a bending strength of 600 MPa or higher, which was higher than that of the test samples of No. 15 to No. 17 where the crystal grains had an average grain size of greater than 1.0 μm and smaller than or equal to 1.5 μm and a grain size standard deviation of 1.0 μm or smaller.

It is assumed that each of the test samples of No. 1 to No. 19 was able to, when subjected to a stress under the action of a load thereon, disperse the stress and prevent the occurrence of a crack due to concentration of the stress onto any of the crystal grains whereby the test samples of No. 1 to No. 19 were improved in mechanical strength as compared to the test samples of No. 20 to No. 23. It is assumed that the test samples of No. 1 to No. 17 obtained a larger effect of suppressing stress concentration and preventing crack formation than that of the test samples of No. 18 and No. 19 because the grain size standard deviation of the crystal grains was smaller in the test samples of No. 1 to No. 17 than in the test samples of No. 18 and No. 19. Furthermore, it is assumed that the test samples of No. 1 to No. 14 obtained a larger effect of suppressing stress concentration and preventing crack formation than that of the test samples of No. 15 to No. 17 because the average grain size of the crystal grains was smaller in the test samples of No. 1 to No. 14 than in the test samples of No. 15 to No. 17.

Although the present invention has been described above with reference to the specific embodiment and examples, the above-described embodiment and examples are intended to facilitate understanding of the present invention and are not intended to limit the present invention thereto. Various changes and modifications can be made to the above embodiment and examples without departing from the scope of the present invention.

In the above embodiment, the present invention is applied to the spark plug 10 in which a spark discharge is generated between the center electrode 15 and the ground electrode 18 joined to the metal shell 18. The present invention is however not limited to this type of spark plug and is applicable to any type of spark plug in which the insulator is in the form of an alumina-based sintered body. For example, the present invention can alternatively be applied to a spark plug in which a barrier discharge is generated around the insulator surrounding the center electrode or a spark plug in which a corona discharge is generated at a front end of the center electrode passing through the insulator.

The entire contents of Japanese Patent Application No. 2018-188625 (filed on Oct. 3, 2018) are herein incorporated by reference. The scope of the present invention is defined with reference to the following claims.

What is claimed is:

1. A spark plug comprising:
   an insulator formed of an alumina-based sintered body,
   wherein the insulator contains 90 wt % or more of an aluminum component in terms of oxide,
   wherein crystal grains of the insulator have an average grain size of 1.5 μm or smaller and a grain size standard deviation of 1.2 μm or smaller, and
   wherein the crystal grains of the insulator have a bending strength of 550 MPa.

2. The spark plug according to claim 1,
   wherein the grain size standard deviation of the crystal grains of the insulator is 1.0 μm or smaller.

3. The spark plug according to claim 1,
   wherein the average grain size of the crystal grains of the insulator is 1.0 μm or smaller.

* * * * *